(12) United States Patent
Boyce

(10) Patent No.: US 11,485,271 B1
(45) Date of Patent: Nov. 1, 2022

(54) ADJUSTABLE MULTI-POSITION BED SYSTEM FOR VEHICLE

(71) Applicant: Justin Tyler Boyce, Littleton, CO (US)

(72) Inventor: Justin Tyler Boyce, Littleton, CO (US)

( * ) Notice: Subject to any disclaimer, the term of this patent is extended or adjusted under 35 U.S.C. 154(b) by 0 days.

(21) Appl. No.: 17/443,583

(22) Filed: Jul. 27, 2021

(51) Int. Cl.
   *B60P 3/39* (2006.01)

(52) U.S. Cl.
   CPC ..................................... *B60P 3/39* (2013.01)

(58) Field of Classification Search
   CPC .................................. B60P 3/39; A47C 17/80
   USPC ..................................... 296/190.02, 169, 174
   See application file for complete search history.

(56) References Cited

U.S. PATENT DOCUMENTS

| | | | | |
|---|---|---|---|---|
| 4,103,373 A | * | 8/1978 | Luedtke | A47C 17/50 5/147 |
| 8,424,132 B2 | * | 4/2013 | Stimel | B60N 2/34 5/118 |
| 2019/0143876 A1 | * | 5/2019 | Spensley | A47C 17/80 296/174 |

* cited by examiner

*Primary Examiner* — Joseph D. Pape

(57) ABSTRACT

An adjustable bed system for recreational vehicles, with independently reconfigurable support platforms that can be quickly adjusted to different elevations or folded and secured into a space saving, stowed position. Each independent platform utilizes a cantilevered design that permits the platform to be self-supporting without the need for any secondary supports above or below the platform. The system includes provisions for quickly attaching and detaching the platforms from a number of available attachment points. Each platform is equipped with a means of self-alignment for ease of operation when moving platforms from one elevation to another. Each platform can be attached across from another platform at the same elevation, staggered at differing elevations, and more than one platform can be used simultaneously in a stacked bunk arrangement.

9 Claims, 6 Drawing Sheets

FIG. 2
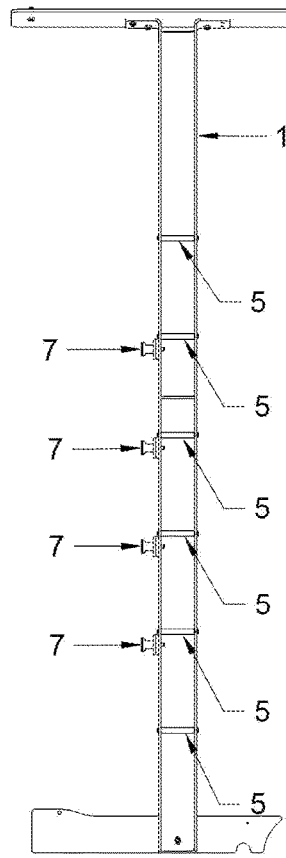
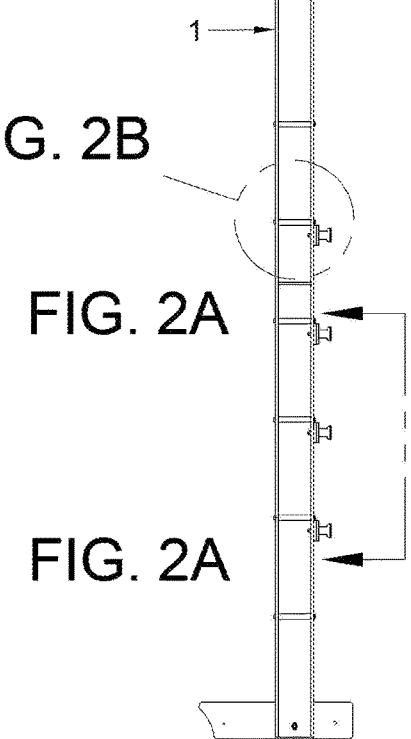
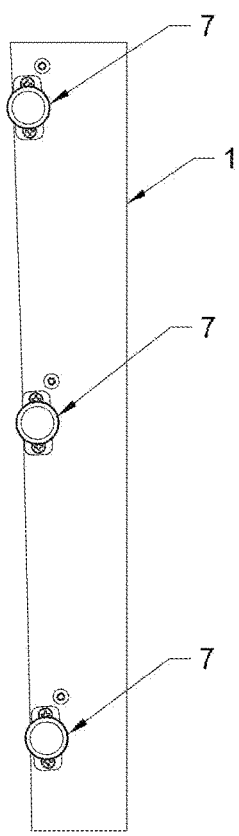
FIG. 2A
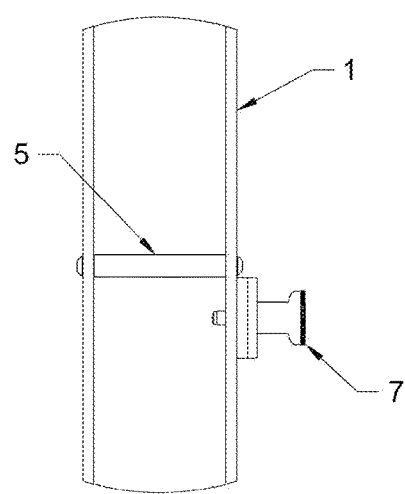
FIG. 2B

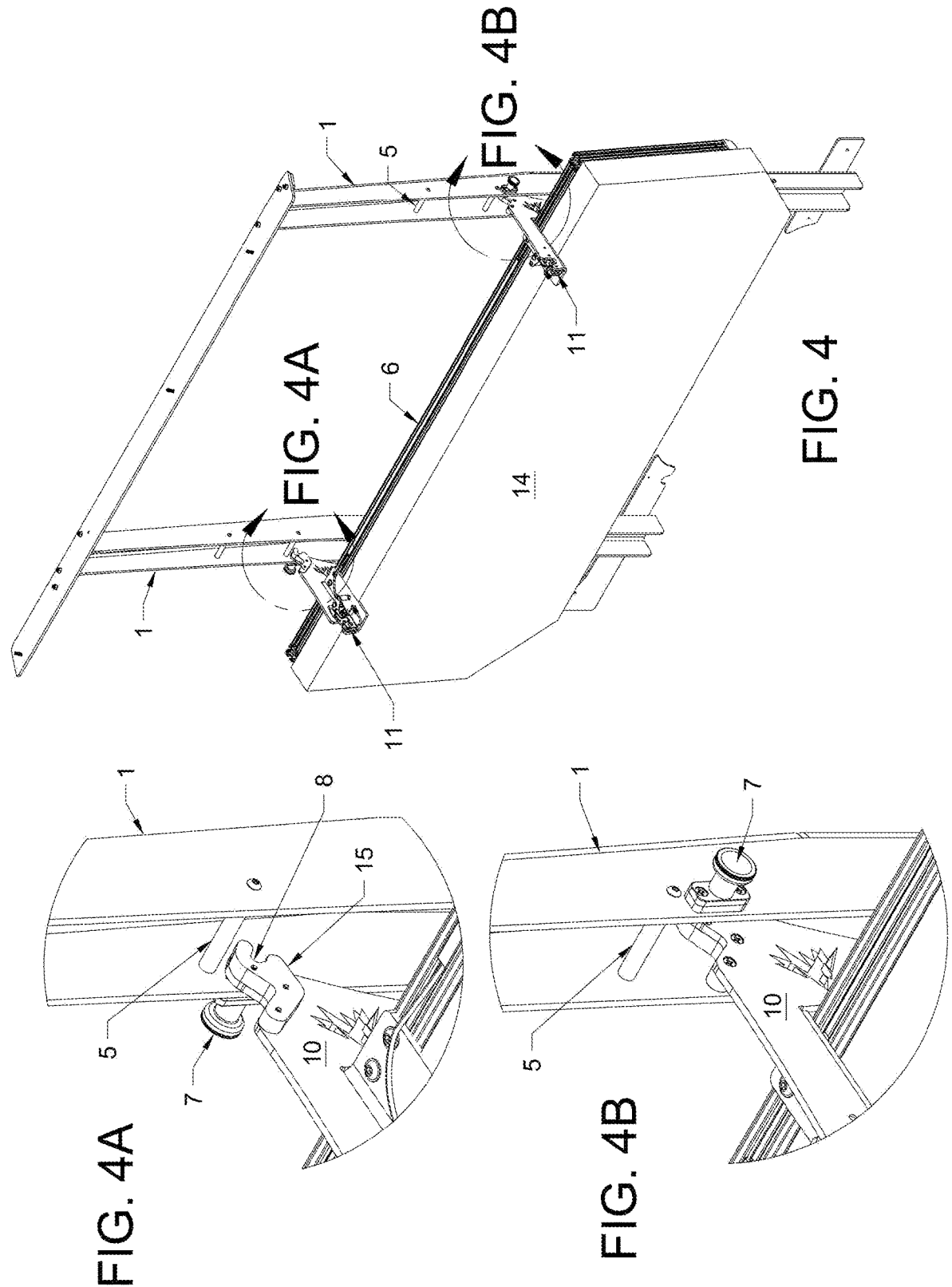

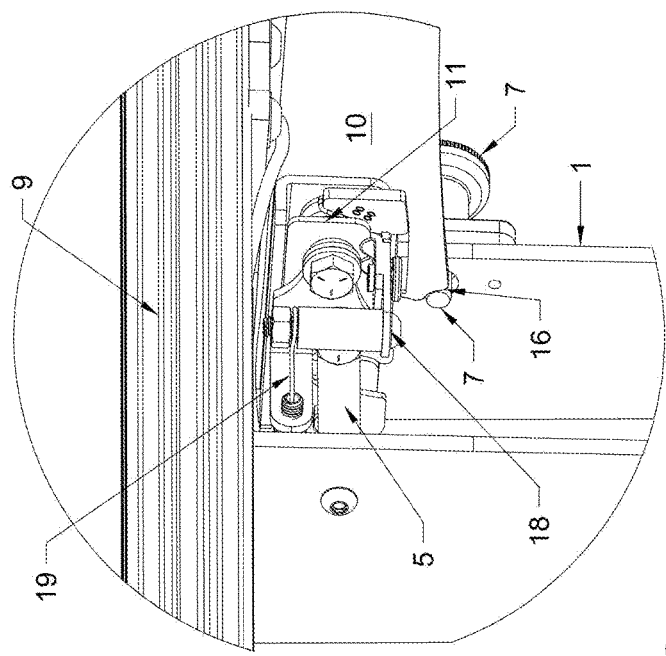
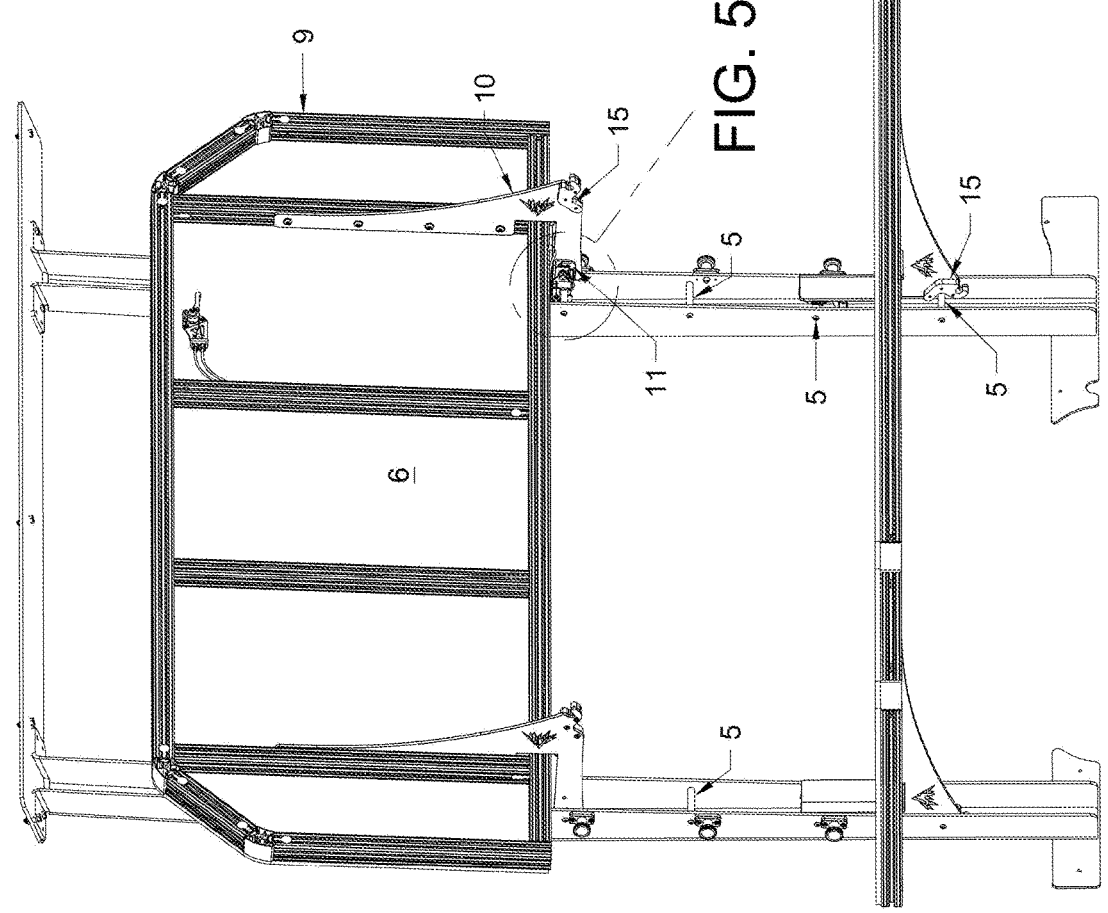

ADJUSTABLE MULTI-POSITION BED SYSTEM FOR VEHICLE

BACKGROUND

Users of vehicles, such as, for example, recreational vehicles (RVs), are faced with a variety of issues, one of which is the inherent problem of finite interior space and how to best utilize it. Objects transported within an RV like tables, cabinetry, beds, coolers, and recreational equipment such as bicycles, motorcycles, kayaks, and surf boards, are often large, unwieldy, and cumbersome. Given the limited footprint within the interior of an RV, it often becomes a challenge to fit each of these necessary items within the vehicle's interior in an economical manner.

Further, because RVs are often used for overnight trips, sleep accommodations must be made. Titus, the RVs must not only be able to sit multiple people and carry cargo items, but there also must be space within the RV's interior to contain multiple beds.

While large RVs may be able to accommodate many of the items mentioned above and also provide sleeping accommodations for multiple people, it is often undesirable to provide such a large vehicle.

What is therefore needed is a bed and cargo storage system that enables a user to readily and easily re-configure the sleeping provisions as necessary to accommodate varying cargo needs and sleeping requirements as to better satisfy each occasion of use.

BRIEF SUMMARY OF THE INVENTION

In one aspect of the present disclosure, a structurally self-supporting, modular, cantilever platform assembly for use within the interior of a recreational vehicle is provided. The assembly includes substantially vertical structural frame components intended to support one or more independent platform assemblies that are capable of being independently positioned at multiple elevations above floor level in both a substantially horizontal deployed, and substantially vertical non-deployed, arrangement to accommodate varying cargo storage needs and provide a diversity of occupant sleeping arrangement options. The cantilever design of the assembly eliminates the need for structural support members above or below the unsupported edge of the platform that would be intrusive or otherwise incumbering to the purpose of storage, work activities, and sleeping accommodation. One embodiment of the assembly includes provisions to aid in the ease of user operation.

BRIEF DESCRIPTION OF THE DRAWINGS

FIG. 2 illustrates an elevation view of an exemplary embodiment of the vertical structural members and associated latching pins and indexing plungers.

FIG. 2A shows a close-up partial side view of FIG. 2 depicting an embodiment of the arrangement of the indexing plungers according to the embodiment of FIG. 2.

FIG. 2B shows a close-up partial view of FIG. 2, where indicated by the circle, depicting an embodiment of the arrangement of the indexing plungers and latching pins on the vertical structural members according to the embodiment of FIG. 2.

FIG. 4 illustrates a perspective view of an embodiment of an individual platform assembly in the hanging position whereby the platform hooks are engaged with the indexing plungers.

FIG. 4A shows a close-up partial perspective view of FIG. 4, where indicated by the circle, further depicting the implementation of the platform hooks and indexing plungers according to the embodiment of FIG. 4.

FIG. 4B shows a close-up partial perspective view of FIG. 4, where indicated by the circle, further depicting the implementation of the platform hooks and indexing plungers according to the embodiment of FIG. 4.

FIG. 5B shows a perspective view of FIG. 5 according to the embodiment illustrated therein.

FIG. 5C shows a close-up partial perspective view of FIG. 5B, where indicated by the circle, further depicting the platform latching mechanism engagement with the latching pin when configured in the folded, non-deployed position, according to the embodiment of FIG. 5B.

DETAILED DESCRIPTION AND BEST MODE OF IMPLEMENTATION

A preferred embodiment of the invention has been described and illustrated by way of example. Those skilled in the art to which the invention belongs will realize that various modifications and changes may be made while still remaining within the spirit and scope of the invention. Hence the invention is not to be limited to the embodiment as described but, rather, the invention encompasses the full range of equivalencies as defined by the accompanying claims.

In describing the invention, it will be understood that a number of configurations are disclosed. Each of these has individual benefit and each can also be used in conjunction with one or more, or in some cases all, of the other disclosed configurations. Accordingly, for the sake of clarity, this description will refrain from repeating every possible combination of the individual combinations in an unnecessary fashion. Nevertheless, the specification and claims should be read with the understanding that such combinations are entirely within the scope of the invention and the claims.

Figure 1:
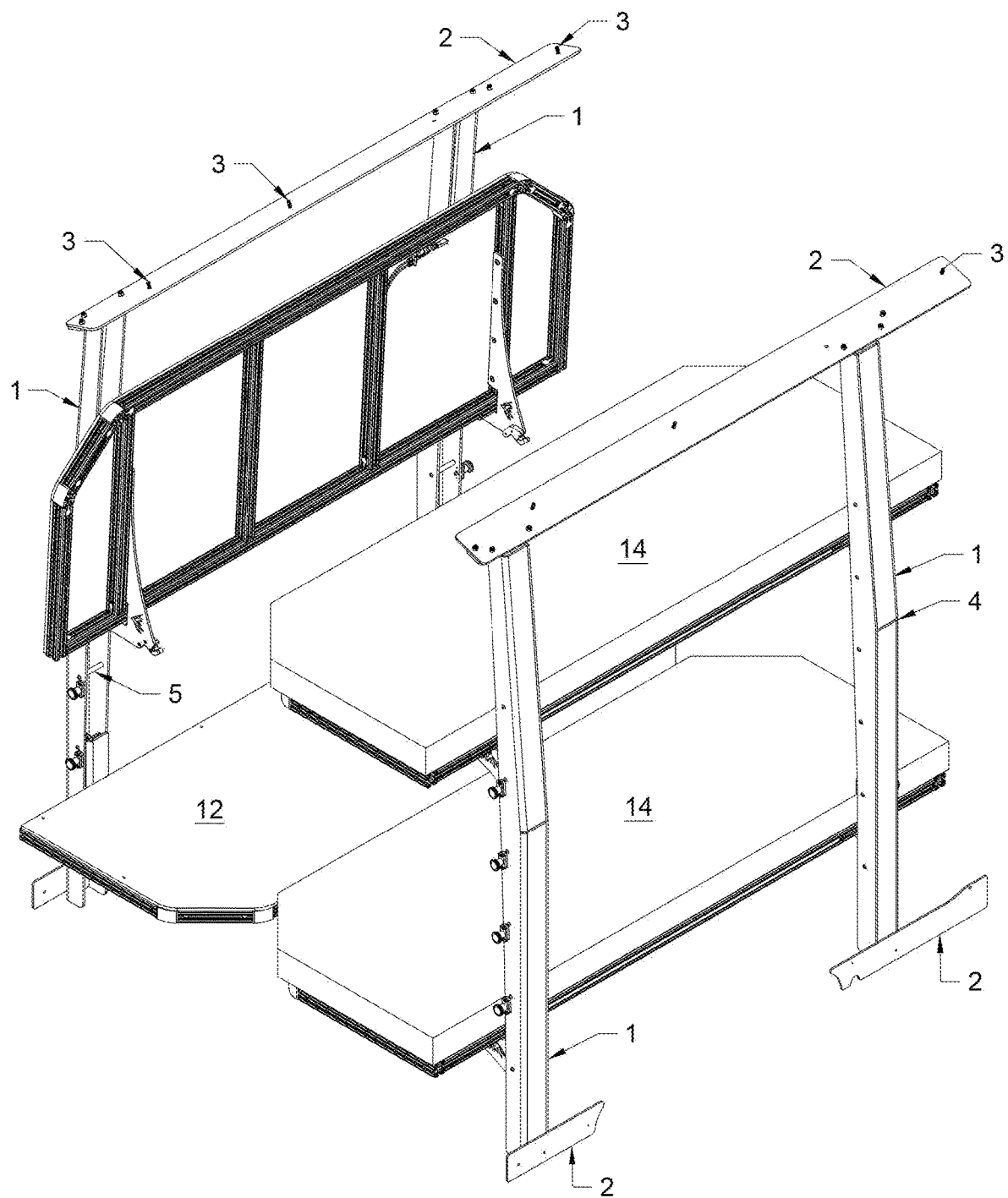
FIG. 1 shows a perspective view of an embodiment of the adjustable multi-position bed system components according to aspects of this disclosure, showing details of various configurations.
Figure 3A:
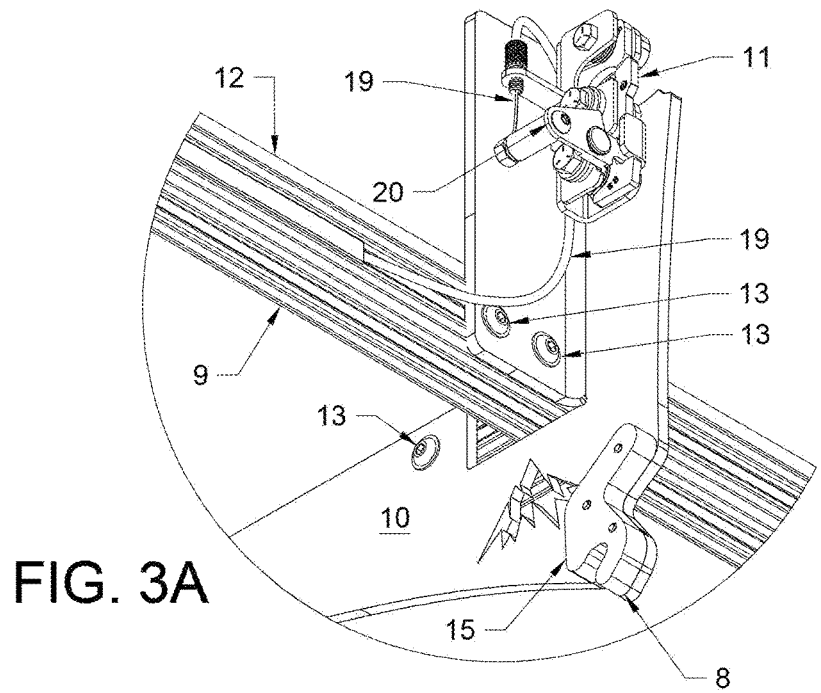
FIG. 3A shows a close-up partial perspective view of FIG. 3, where indicated by the circle, depicting details of the latching mechanism and structural bracketry of the platform according to the embodiment of FIG. 3.
Figure 3:
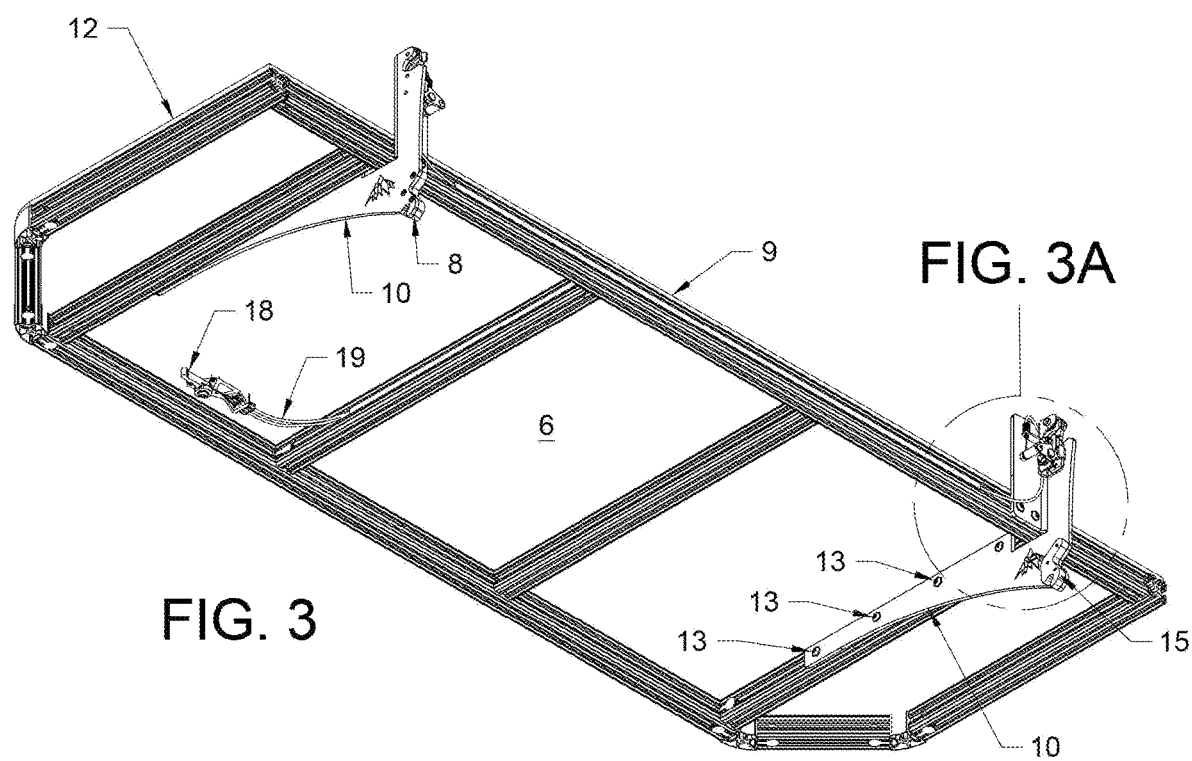
FIG. 3 shows a bottom perspective view of an exemplary individual platform assembly.

The present invention will now be described by example and through referencing the appended figures representing preferred and alternative embodiments. FIG. 1 shows the components in the preferred embodiment of a multi-position bed system. Substantially vertical structural members 1 can span from floor to ceiling and can be located at the perimeter of the cargo area, abutting the vehicle's exterior walls. The structural members 1 can be secured to the side walls and roof structure of the vehicle by means of structural adapter plates 2 and bolted or welded connections 3 that may be configured to utilize preexisting vehicle mounting provisions. In alternate embodiments, additional mounting hardware, alternate mounting methods, alternate adapters, and structural reinforcements may be necessary as dictated by the unique requirements of each vehicle application. In the preferred embodiment, the structural members 1 are comprised of a steel channel, formed 4 to accommodate the profile of the vehicle wall geometry. In other embodiments, these members may be constructed from other materials such as aluminum, carbon fiber, and fiberglass and be conformed to a shape that provides adequate structural integrity for the application. As shown in FIG. 2, in one embodiment, the structural members may be equipped with one or more latch strike pin 5 provisions for engaging, latching, locking or otherwise removably securing the individual platform assemblies 6 as shown in FIG. 3 (described further below) to the structural members 1 as shown in FIGS. 2 and 2A at a number of different vertical elevations along the structural member's length. In the preferred embodiment, FIGS. 2 and 2A shows multiple indexing plungers 7 secured to the outermost face of each of the structural members 1 corresponding with the height and location and each of the aforementioned strike pin 5 provisions such that platform hooks 8, shown in FIGS. 3 and 4A, (described further below) can be hung from the indexing plungers 7 to enable an individual user to easily adjust and reconfigure the platform 6 arrangement without the need for additional assistance from a second person or need for full dexterity and precise, manual alignment of assembly components to successfully engage the movable platforms 6 with the structural members 1.

FIG. 3 illustrates the preferred embodiment of an individual platform assembly 6. In the preferred embodiment, the assembly shown is constructed from an extruded aluminum frame 9. The frame 9 may be load bearing and equipped with mounting provisions for structural bracketry 10 and a latching mechanism 11. In other embodiments, the frame 9 may be constructed from steel, carbon fiber, honeycomb paneling, or other suitable material that someone skilled in the art could envision to serve the same function. As depicted in FIGS. 1, 3 and 3A, the platform frame 9 can be topped with a flat continuous surface 12 to distribute load forces and provide a solid surface for a diverse application of uses such as sleeping, working, eating, and carrying cargo. In the example embodiment shown, the top surface 12 and structural bracketry 10 can be secured to the aluminum frame 9 by means of mechanical fasteners 13. In one embodiment shown, the platform may be used to support a mattress 14 as depicted in FIGS. 1 and 4.

Figure 5A:
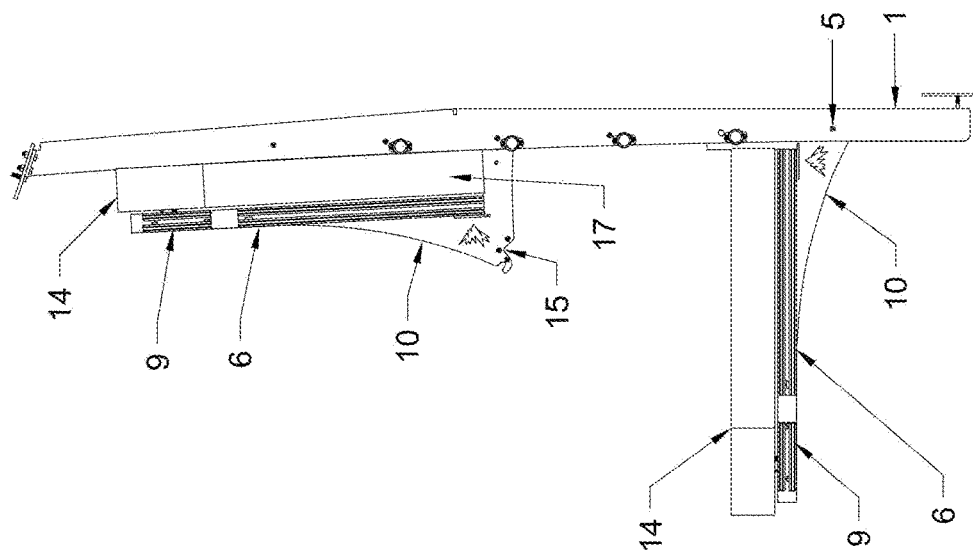
FIG. 5A depicts a side elevation view of FIG. 5 according to the embodiment illustrated therein.
Figure 5:
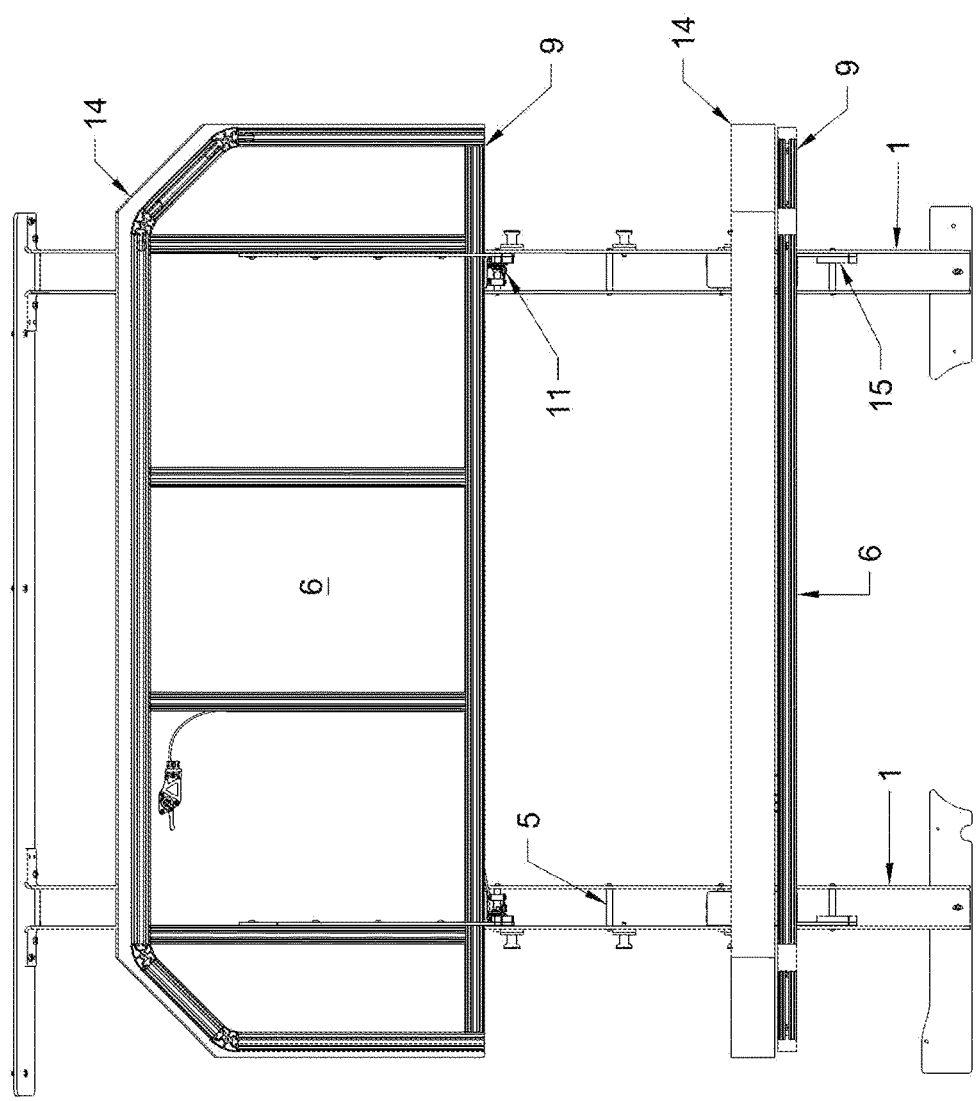
FIG. 5 illustrates an elevation view of an embodiment of two individual platforms configurations. One platform is shown in the deployed, horizontal position and the other platform is shown in the vertical, non-deployed position.

In the preferred embodiment depicted, each of the structural brackets 10 affixed to the platform frame 9 can be fitted with a commercially available rotary latching mechanism 11 at the topmost portion of the bracket 10 geometry, as illustrated in FIG. 3A. As shown in FIG. 5C, the rotary latch 11 is intended to work in unison with and engage the strike pin 5 provisions of the vertical structural members 1 to allow temporary attachment and detachment at various elevations depicted in FIG. 5, 5A, 5B. When in the deployed substantially horizontal configuration, the latch 11 will be under a tension load and responsible for suspending the platform assembly 6 from the vertical structural members 1 as shown in FIG. 5B. As depicted in FIG. 3, 3A, 4A, 5B, the lower portion of the structural platform brackets 10 may be equipped with a bumper 15 shaped to rest against the surface of the adjacent strike pin 5 provision below, such that when the platform assembly 6 is in the substantially horizontal deployed arrangement, this portion of the bracket 10 and bumper 15 will be under compression against the locking pin 5 provision, transmitting the load forces to the substantially vertical structural members 1. In preferred embodiments, the combination of the rotary latch 11 in tension and the bumper 15 in compression provides the strength necessary to cantilever the platform assembly 6 from the vertical structural members 1 alone without need for additional supports.

In one embodiment, when in the latched, engaged, position the platform assembly 6 and its rotary latch 11 mechanism can be rotated around the axis of the locking pin 5 such that the platform assembly 6 can be lifted vertically and folded against the wall in a substantially vertical, non-deployed, position, as shown in FIGS. 5, 5A, 5B, and 5C. When in the position, the shape and geometry of the platform brackets 10 enable the platform assemblies 6 to be optionally stowed in the substantially vertical, non-deployed, position by means of mechanical interference 16 with the respective indexing plunger 7 at that elevation as depicted in FIG. 5C. In the preferred embodiment shown in FIG. 5A, when positioned in the substantially vertical, non-deployed, configuration, the geometry of the platform bracketry 10 can accommodate the dimensional thickness of typical bedding materials 17 such that they do not need to be removed prior to the platform being folded into this position.

In the preferred embodiment, to facilitate repositioning or removal of one or more platform assemblies 6, means of manually disengaging the rotary latch 11 from its engagement with the latching pins 5 may be provided in the form of a manually operated release lever 18 (see FIG. 3) that may utilize control cables 19 to remotely actuate a release mechanism 20 (see FIG. 3A) on the commercially available rotary latch 11. When the lever 18 is depressed by the user, the control cable 19 can be shortened, thereby pulling on the release arms 20 of both rotary latches 11 simultaneously as to allow the entire platform assembly 6 to become disengaged from the substantially vertical structural members 1 depicted in FIG. 2.

Ash shown in FIGS. 4, 4A and 4B, in the preferred embodiment, to aid in the operation of repositioning the platform 6 from one latching location 5 to another, the platform brackets 10 may be equipped with positioning hooks 8 that can be hung off the indexing plungers 7 on each respective structural member 1. When the platform positioning hooks 8 are hung off the indexing plungers 7 located at the same elevation above the floor, the weight of the platform 6 may then be fully supported by the indexing plungers 7 while the user rotates the platform 6 upward around the axis of the indexing plunger 7 from a vertical position into a horizontal position. Due to the interaction of geometry between the platform positioning hooks 8, the indexing plungers 7, and the strike pins 5, once the platform 6 is raised into the substantially horizontal position, the rotary latching mechanisms 11 of the platform 6 will resultingly be aligned favorably with the respective strike pins 5 at that location, as to produce a self-aligning means of repositioning the platform 6 from one latching location 5 to another.

As shown in FIG. 1, in the preferred embodiment, the platforms 6 may be arranged on either side of the vehicle interchangeably at any of the available latching elevations 5 (see FIG. 2). When more than one platform 6 is engaged at differing elevations and positioned in the substantially horizontal deployed configuration on the same side of the vehicle, a stacked bunk arrangement can be created. Likewise, when more than one platform 6 is engaged and they are positioned at the same elevation in the substantially horizontal deployed configuration on opposing sides of the vehicle, a collectively larger surface created by the abutting platforms 6 will effectively result to better serve such uses as sleeping on a large mattress 14 and carrying oversized cargo.

The invention claimed is:

1. An adjustable multi-position bed system for use within the interior of a recreational vehicle comprising:
    two or more substantially vertical structural members, each of the two or more substantially vertical structural members including a plurality of striking pins and a plurality of indexing plungers;
    at least one independent platform assembly adapted to be converted from a non-deployed configuration to a substantially horizontal deployed configuration;
    a set of bracketry coupled to the at least one independent platform assembly, the bracketry adapted to interface with the plurality of striking pins and the indexing plungers.

2. The adjustable multi-position bed system of claim 1, wherein said substantially vertical structural members are provisioned with one or more latching points along the substantially vertical structural member's length at a number of vertical elevations.

3. The adjustable multi-position bed system of claim 1, wherein said independent platform assemblies are capable of engaging and becoming rotatably and removably secured to any number of said latching points on said substantially vertical structural members.

4. The adjustable multi-position bed system of claim 1, wherein said independent platform assemblies are capable of being disconnected and completely removed.

5. The adjustable multi-position bed system of claim 1, wherein said substantially vertical structural members and latching points are capable of adequately supporting one or more said independent platform assemblies in the deployed substantially horizontal cantilevered configuration as to render any additional structural support members unnecessary.

6. The adjustable multi-position bed system of claim 1, wherein the provision of said independent platform assemblies and said substantially vertical structural members are configured to provide a means of self-alignment when user is repositioning the platform from one latching location to another.

7. The adjustable multi-position bed system of claim 1, wherein said independent platform assemblies can be folded upward and stowed in a non-deployed substantially vertical configuration using a mechanical locking device.

8. The adjustable multi-position bed system of claim 1, wherein more than one said independent platform assembly can be simultaneously configured in a bunk configuration with two or more said platform assemblies latched above and below one another on the same substantially vertical structural members.

9. The adjustable multi-position bed system of claim 1, wherein more than one said independent platform assembly can be configured in a coplanar abutting configuration whereby two or more said platform assemblies are latched adjacent to one another at substantially the same elevation.

* * * * *